March 30, 1926.

J. A. TIDMORE

VEHICLE SPRING

Filed Sept. 11, 1924

1,578,297

Inventor
Jesse A. Tidmore

Watson E. Coleman
Atty

Patented Mar. 30, 1926.

1,578,297

UNITED STATES PATENT OFFICE.

JESSE A. TIDMORE, OF BELLAMY, ALABAMA.

VEHICLE SPRING.

Application filed September 11, 1924. Serial No. 737,133.

*To all whom it may concern:*

Be it known that I, JESSE A. TIDMORE, a citizen of the United States, residing at Bellamy, in the county of Sumter and State of Alabama, have invented certain new and useful Improvements in Vehicle Springs, of which the following is a specification, reference being had to the accompanying drawings.

This invention relates to certain improvements in vehicle springs and has relation more particularly to novel and improved means coacting with the conventional front spring of a vehicle and the associated body to hold the body against undue rocking or side swaying particularly when the vehicle is travelling over wet and rough roads.

It is also an object of the invention to provide novel and improved means whereby the conventional front spring of a vehicle is prevented from breaking on the rebound and to materially reduce the liability of the vehicle from turning over.

The invention consists in the details of construction and in the combination and arrangement of the several parts of my improved vehicle spring whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
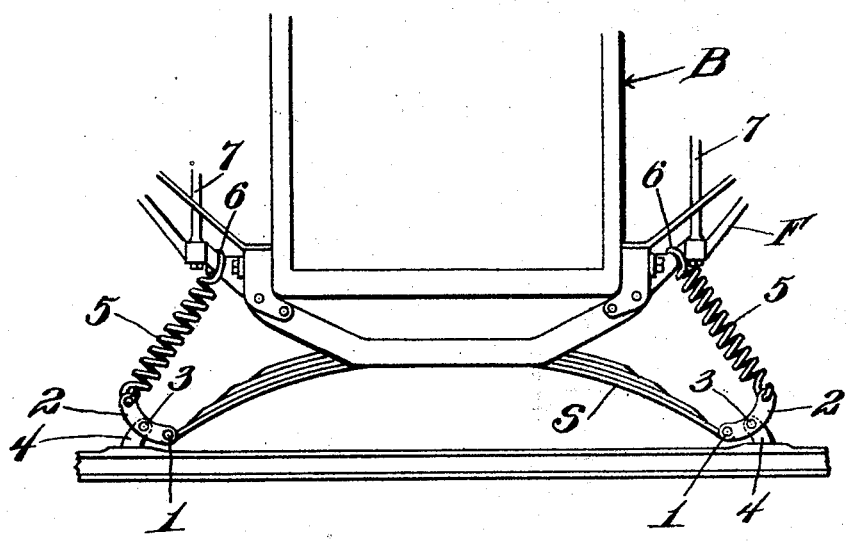
Figure 1 is an elevational view illustrating a vehicle spring constructed in accordance with an embodiment of my invention.
Figure 2:
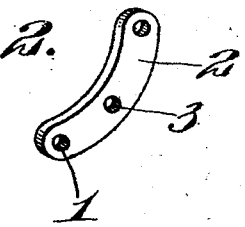
Figure 2 is a view in perspective of one of the levers as herein disclosed unapplied.

As disclosed in the accompanying drawings, B denotes the body of an automobile having secured thereto the conventional semi-elliptical front spring S. Each end extremity of the spring S is operatively engaged, as at 1, with the inner end portion of a lever 2, said lever 2 being pivotally connected, as at 3, substantially midway its ends, with the upstanding bracket 4 carried by the front axle A. The opposite or upper end portion of the lever 2 has secured thereto an extremity of a retractile coil spring 5 the opposite end portion of which being attached, as at 6, to the adjacent fender brace F at a point between the lamp post 7 and the frame or body B.

By mounting each of the springs 5 in the manner referred to, the body B is held against undue rocking or swaying movement when the vehicle is travelling over wet and rough roads. In turning stiff curves these springs also operate to hold the front end of the car level and thereby substantially reducing the liability of the car turning over. The action of the springs 5 also serves to prevent the front spring S from breaking on the rebound which in itself is of decided advantage.

From the foregoing description it is thought to be obvious that a vehicle spring constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the body of a vehicle and an axle therebeneath, a cross spring carried by the body, upstanding brackets carried by the axle, levers pivotally supported substantially midway their ends by the brackets, the extremities of the spring being secured to the inner ends of the levers, and retractile coil springs secured to the opposite end portions of the levers and to the side portions of the body.

2. In combination with the body of a vehicle provided with front fenders, braces for the fenders and a front axle, a semi-elliptical front spring secured to the body, upstanding brackets carried by the opposite end portions of the axle, levers pivotally supported substantially midway their ends by the brackets, the extremities of the spring being secured to the inner end portions of the levers, and retractile members secured to the opposite end portions of the levers and to the fender braces at a point closely adjacent to the body.

3. In a vehicle including an axle, a car body and leaf spring, the combination therewith of a supporting post on said axle, a lever supported to rock on said post, a pivotal connection between the said leaf spring and the inner end of said lever, and a coiled spring secured at one end to said car body and at its other end to the outer arm of said lever in the manner described.

4. In a vehicle including an axle, a car frame and a leaf spring between said frame and axle, a post on said axle, a lever supported between its ends to rock on said post, means to secure one end of said lever to said leaf spring, and a coiled tension spring securing the other end of said lever to said car frame.

5. In a vehicle including an axle, a car frame and a leaf spring between said frame and axle, the combination therewith of a lever pivotally supported on said axle, means to secure one end of said lever to said leaf spring, and resilient means interposed between and secured to the frame and the other end of the lever to resist movement of the other end of said lever away from said car frame.

6. In a vehicle including an axle, a car frame and a leaf spring between said frame and axle, the combination therewith of a lever pivotally supported on said axle, means to secure one end of said lever to said leaf spring, and retractile means to resist movement of the other end of said lever away from said car frame.

In testimony whereof I hereunto affix my signature.

JESSE A. TIDMORE.